(12) United States Patent
Zhou et al.

(10) Patent No.: US 10,970,439 B2
(45) Date of Patent: Apr. 6, 2021

(54) SYSTEM ON CHIP (SOC) CURRENT PROFILE MODEL FOR INTEGRATED VOLTAGE REGULATOR (IVR) CO-DESIGN

(71) Applicant: Taiwan Semiconductor Manufacturing Company, Ltd., Hsinchu (TW)

(72) Inventors: Haohua Zhou, Fremont, CA (US); Tze-Chiang Huang, Saratoga, CA (US); Mei Hsu Wong, Saratoga, CA (US)

(73) Assignee: Taiwan Semiconductor Manufacturing Company, LTD

( * ) Notice: Subject to any disclaimer, the term of this patent is extended or adjusted under 35 U.S.C. 154(b) by 0 days.

(21) Appl. No.: 16/599,823

(22) Filed: Oct. 11, 2019

(65) Prior Publication Data

US 2020/0175129 A1    Jun. 4, 2020

Related U.S. Application Data

(60) Provisional application No. 62/772,966, filed on Nov. 29, 2018, provisional application No. 62/857,373, filed on Jun. 5, 2019.

(51) Int. Cl.
| | |
|---|---|
| *G06F 30/30* | (2020.01) |
| *H01L 23/538* | (2006.01) |
| *H01L 23/528* | (2006.01) |
| *H01L 23/50* | (2006.01) |
| *G06F 30/39* | (2020.01) |
| *G06F 30/367* | (2020.01) |

(52) U.S. Cl.
CPC ............ *G06F 30/30* (2020.01); *G06F 30/367* (2020.01); *G06F 30/39* (2020.01); *H01L 23/50* (2013.01); *H01L 23/5286* (2013.01); *H01L 23/5384* (2013.01)

(58) Field of Classification Search
CPC ........ G06F 30/30; G06F 30/367; G06F 30/39; H01L 23/5384; H01L 23/50; H01L 23/5286
USPC ........................................................ 716/120
See application file for complete search history.

(56) References Cited

U.S. PATENT DOCUMENTS

| | | | |
|---|---|---|---|
| 9,536,625 B1 * | 1/2017 | Quinton | G11C 29/023 |
| 10,599,799 B1 * | 3/2020 | Zhu | G06F 30/36 |
| 2017/0263588 A1 * | 9/2017 | Chen | H01L 25/50 |

* cited by examiner

*Primary Examiner* — Jack Chiang
*Assistant Examiner* — Brandon Bowers
(74) *Attorney, Agent, or Firm* — Merchant & Gould P.C.

(57) ABSTRACT

A System On Chip (SOC) current profile model for Integrated Voltage Regulator (IVR) co-design may be provided. A first current profile model may be extracted corresponding to an SOC at a first design stage of the SOC. Then it may be determined that an IVR and the SOC pass a first co-simulation based on the extracted first current profile model. Next, a second current profile model may be extracted corresponding to the SOC at a second design stage of the SOC. Then it may be determined that the IVR and the SOC pass a second co-simulation based on the extracted second current profile model. A third current profile model may be extracted corresponding to the SOC at a third design stage of the SOC. Then it may be determined that the IVR and the SOC pass a third co-simulation based on the extracted third current profile model.

20 Claims, 9 Drawing Sheets

SYSTEM ON CHIP (SOC) CURRENT PROFILE MODEL FOR INTEGRATED VOLTAGE REGULATOR (IVR) CO-DESIGN

CROSS-REFERENCE TO RELATED APPLICATIONS

This application claims the benefit of U.S. Provisional Application Nos. 62/772,966, filed on Nov. 29, 2018, and 62/857,373, filed on Jun. 5, 2019, both entitled "System On Chip (SOC) Current Profile Model For Integrated Voltage Regulator (IVR) Co-Design", of which the entire disclosures are hereby incorporated by reference in their entirety.

BACKGROUND

A System on Chip (SOC) is an integrated circuit (also known as a "chip") that integrates components of a computer or other electronic system. These components typically, but not always, include a Central Processing Unit (CPU), memory, input/output ports, and secondary storage all on a single substrate or microchip. It may contain digital, analog, mixed-signal, and often radio frequency signal processing functions, depending on the application. Because they are integrated on a single substrate, SOCs consume much less power and take up much less area than multi-chip designs with equivalent functionality. Because of this, SOCs are very common in the mobile computing (e.g., Smartphones) and edge computing markets. SOCs are commonly used in embedded systems and the Internet of Things (IoT).

SOCs are in contrast to the common traditional motherboard-based PC architecture that separates components based on function and connects them through a central interfacing circuit board. Whereas a motherboard houses and connects detachable or replaceable components, SOCs integrate all of these components into a single integrated circuit, as if all these functions were built into the motherboard. An SOC may integrate a CPU, graphics and memory interfaces, hard-disk and USB connectivity, random-access and read-only memories, and secondary storage on a single circuit die, whereas a motherboard would connect these modules as discrete components or expansion cards.

More tightly integrated computer system designs improve performance and reduce power consumption as well as semiconductor die area needed for an equivalent design composed of discrete modules at the cost of reduced replaceability of components. By definition, SOC designs are fully or nearly fully integrated across different component modules. For these reasons, there has been a general trend towards tighter integration of components in the computer hardware industry, in part due to the influence of SOCs and lessons learned from the mobile and embedded computing markets. SOCs can be viewed as part of a larger trend towards embedded computing and hardware acceleration.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
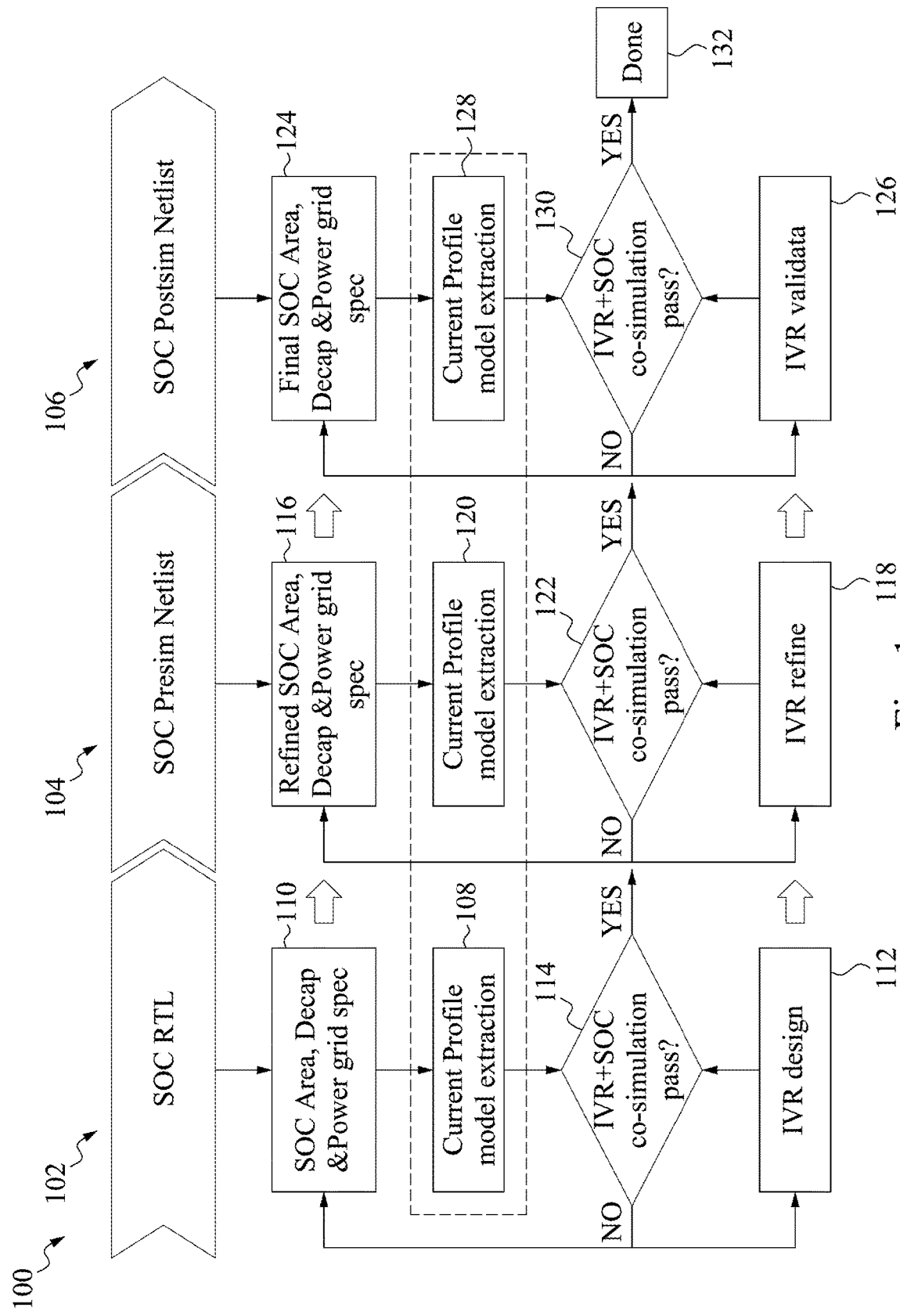
FIG. 1 shows a method for providing an integrated co-design of an SOC and an IVR in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Integrated Circuits (ICs) include a silicon die that carry passive devices such as capacitors and inductors for integration into a circuit system. Similar to other chips, these are built on one side of a silicon wafer. The active surface contains interconnects necessary for connecting from the outside world to the passive device on the chip.

Integrated Voltage Regulators (IVRs) may be employed in Systems on Chips (SOCs). IVRs may include an inductor (e.g., coupled inductor voltage regulator) and a capacitor (e.g., deep trench capacitor). Current IVRs position a coupled inductor voltage regulator and a deep trench capacitor underneath a substrate of an SOC fanout package. A fanout package is fabricated by fanout wafer-level packaging (fanout WLP), which is an integrated circuit packaging technology, and an enhancement of standard wafer-level packaging (WLP) solutions. Problems with the current integrated voltage regulator strategy may include, for example, the coupled inductor voltage regulator and the deep trench capacitor taking up too much space on the SOC package and/or blocking SOC signals.

Embodiments of the disclosure may provide an IVR integrated with an SOC to reduce system solution size, improve power delivery efficiency, provide more flexible dynamic voltage and frequency scaling (DVFS) to save power, and improve power integrity by shortening the power delivery current loop inductance. In addition, IVRs consistent with embodiments of the disclosure may be customized for an SOC, with each IVR and SOC solution being co-simulated in early design stages to let designers of the IVR know better about the load, thus reducing underdesign risks and overdesign costs.

Conventional Voltage Regulators (VRs) and SOC are designed independently, with co-simulation happening after the SOC design is done. As a result, conventional processes may result in a long Turnaround Time (TAT), a difficult to achieve optimized solution, a need to overdesign SOC and VR to cover variations on die, substrate, and board. In addition, conventional VRs are placed on a Printed Circuit Boards (PCBs), which are designed in a late stage, potentially making the SOC and VR integration TAT long and the SOC and VR overdesigned to allow for more margin.

High power density IVR/SOC chip and package level integration may need to allow for IVR and SOC specification trade-off to meet tighter power integrity requirements. However, with conventional processes, iterations need to re-spin both the SOC and the VR, which will be costly and create time delays (e.g., up to 1-2 years).

Conventional processes do not generate reasonable current profiles to analyze the IVR specification in the early stage or stages. Nor do they have a consistent simulation environment for IVR and SOC co-simulation across the SOC design stage.

Embodiments of the disclosure may provide a consistent SOC Current Profile Model extraction through an SOC Register-Transfer Level (RTL) design stage, a pre-simulation (i.e., presim) design stage, and a post simulation (i.e., postsim) design stage that may have power mesh, bump, decoupling capacitor (i.e., decap), and current waveform information for IVR/SOC co-design at an early stage. Moreover, embodiments of the disclosure may provide a process to extract power mesh, bump, decoupling capacitor, and current profile (i.e., I(t)) models at any SOC power simulation design stage.

Furthermore, embodiments of the disclosure may provide a process of flipping back current profile I(t) to avoid false current changes caused by loops to make simulations more realistic. Also, embodiments of the disclosure may include a regression process for co-design convergence and margin control. These processes may apply to all types of IVRs such as switching regulators and Low-dropout (LDO) regulators consistent with embodiments of the disclosure.

Accordingly, embodiments of the disclosure may provide a faster TAT time for IVR and SOC co-design. In addition, embodiments of the disclosure may provide consistent IVR and SOC co-simulation for IVR design to avoid overdesign and to allow the designer to perform progressive margin control.

FIG. 1 shows a method 100 consistent with embodiments of the disclosure for providing an integrated co-design of an SOC and an IVR. As shown in FIG. 1, method 100 may have a first design stage 102 of the SOC, a second design stage 104 of the SOC, and a third design stage 106 of the SOC. While FIG. 1 shows three design stages, embodiments of the disclosure may comprise any number of design stages and are not limited to three. For example, first design stage 102 may comprise a Register-Transfer Level (RTL) design stage of the SOC, second design stage 104 may comprise a pre-simulation (i.e., presim) design stage of the SOC, and third design stage 106 may comprise a post-simulation (i.e., postsim) design stage of the SOC.

At the RTL design stage (i.e., the first design stage 102 in the example mentioned above) of the SOC, an RTL description of the SOC is generated, which could be converted to a gate-level description of the SOC circuit by a logic synthesis tool. The synthesis results are then used by placement and routing tools to create a physical layout. RTL is a design abstraction which models a synchronous digital circuit in terms of the flow of digital signals between hardware registers, and the logic operations performed on those signals. RTL abstraction is used in hardware description languages (HDLs) like Verilog and VHDL to create high-level representations of a circuit, from which low-level representations and ultimately actual wiring can be derived.

At the presim design stage (i.e., the second design stage 104 in the example mentioned above) of the SOC, pre-layout simulation is conducted. At the postsim design stage (i.e., the third design stage 106 in the example mentioned above) of the SOC, post-layout simulation is conducted.

At each of the design stages of method 100, a current profile model may be extracted from specification data for the SOC. Examples of specification data for the SOC include: SOC area, decoupling capacitor (decap), and power grid specification data for the SOC. It should be noted that other specification data for the SOC may be employed to extract the current profile model. The extracted current profile model for the SOC may then be used along with the IVR design data to co-simulate the IVR and SOC. If the co-simulation passes, method 100 may move on to the next design stage. In this way a parallel IVR and SOC co-design flow may be provided that allows for a shorter TAT time where specification trade-offs may be realized much earlier in the design process.

As shown in FIG. 1, at first design stage (e.g., the RTL design stage) 102, a first current profile model 108 may be extracted from SOC area, decoupling capacitor, and power grid specification data 110 for the SOC. Extracted current profile model 108 for the SOC may then be used along with IVR design data 112 to co-simulate the IVR and SOC. If the co-simulation passes at decision block 114, method 100 may continue to second design stage (e.g., the presim design stage) 104. If the co-simulation does not pass, SOC area, decoupling capacitor, and power grid specification data 110 and/or IVR design data 112 may be changed and the co-simulation may be rerun. This may be repeated until the co-simulation passes.

At second design stage (e.g., the presim design stage) 104, SOC area, decoupling capacitor, and power grid specification data 110 may be refined to create SOC area, decoupling capacitor, and power grid specification data 116. Similarly, IVR design data 112 may be refined to create IVR design data 118. Then at second design stage (e.g., the presim design stage) 104, a second current profile model 120 may be extracted from SOC area, decoupling capacitor, and power grid specification data 116 for the SOC. Extracted current profile model 120 for the SOC may then be used along with IVR design data 118 to co-simulate the IVR and SOC. If the co-simulation passes at decision block 122, method 100 may continue to third design stage (e.g., the postsim design stage) 106. If the co-simulation does not pass, SOC area, decoupling capacitor, and power grid specification data 116 and/or IVR design data 118 may be changed and the co-simulation may be rerun. This may be repeated until the co-simulation passes.

At third design stage (e.g., the postsim design stage) 106, SOC area, decoupling capacitor, and power grid specification data 116 may be finalized to create SOC area, decoupling capacitor, and power grid specification data 124. Similarly, IVR design data 118 may be finalized to create IVR design data 126. Then at third design stage (e.g., the postsim design stage) 106, a third current profile model 128 may be extracted from SOC area, decoupling capacitor, and power grid specification data 124 for the SOC. Extracted current profile model 128 for the SOC may then be used along with IVR design data 126 to co-simulate the IVR and SOC. If the co-simulation passes at decision block 130, method 100 may end at stage 132. If the co-simulation does not pass, SOC area, decoupling capacitor, and power grid specification data 124 and/or IVR design data 126 may be changed and the co-simulation may be rerun. This may be repeated until the co-simulation passes.

Accordingly, the IVR may be customized for the SOC, and each IVR and SOC solution may be co-simulated in early design stages (e.g., first design stage 102 and second design stage 104) to let the IVR designer know more about the load for the SOC, thus reducing underdesign risks and overdesign costs. In other words, when the IVR designer knows that the load for the SOC is higher than expected, the IVR designer may raise the capacity of the IVR to avoid underdesign risks; and when the IVR designer knows that the load for the SOC is lower than expected, the IVR designer may reduce the capacity of the IVR to avoid overdesign costs. Consequently, embodiments of the disclosure may provide a fast TAT time for the IVR and SOC co-design. In addition, embodiments of the disclosure may provide consistent IVR and SOC co-simulations for IVR design to avoid overdesign and to allow the designer to perform progressive margin control.

Figure 2:
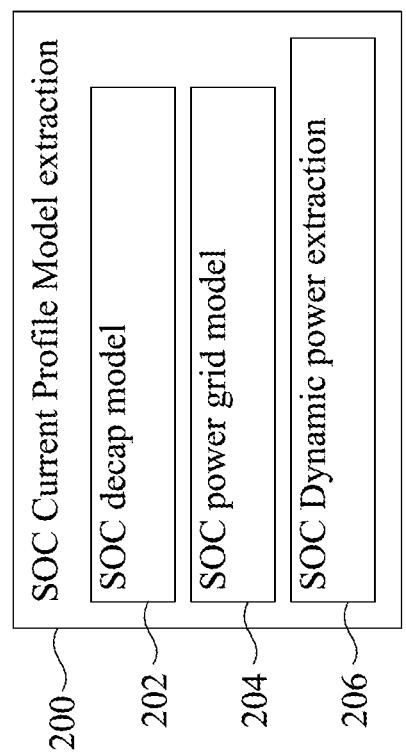
FIG. 2 illustrates a current profile model extraction in accordance with some embodiments.

FIG. 2 illustrates the current profile model extraction described above with respect to FIG. 1. As shown in FIG. 2, SOC current profile model extraction 200 may comprise a decoupling capacitor (i.e., decap) model 202, a power grid model 204, and a dynamic power extraction 206, which are further discussed below with FIGS. 3 through 6.

Figure 3:
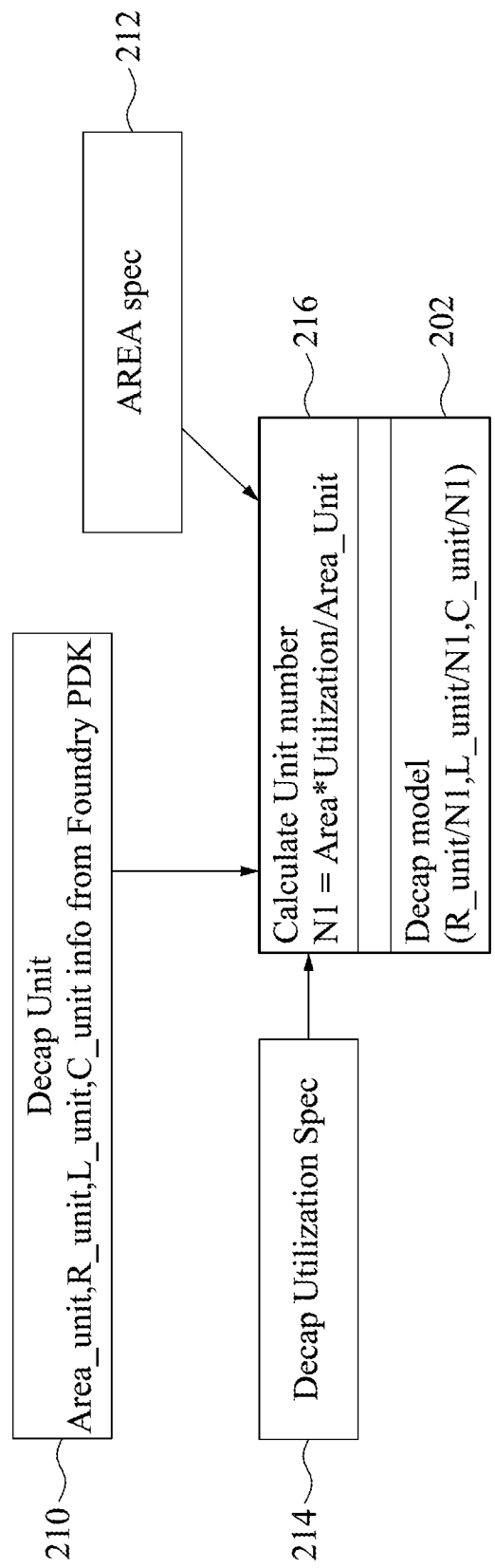
FIG. 3 illustrates a decoupling capacitor model extraction in accordance with some embodiments.

FIG. 3 illustrates decoupling capacitor (decap) model 202 extraction from FIG. 2 in more detail. As shown in FIG. 3, SOC decoupling capacitor model 202 may be determined by calculating the number of units 216 based on decoupling capacitor unit data 210, area specifications 212 and decoupling capacitor utilization specifications 214. A decoupling capacitor is a capacitor used to decouple one part of an electrical network or circuit from another. Decoupling capacitor unit data 210 may be obtained from data in a foundry Process Design Kit (PDK). The decoupling capacitor unit data 210 may comprise, but are not limited to, area per unit (Area_unit), resistance per unit (R_unit), inductance per unit (L_unit), and capacitance per unit (C_unit). Area may be obtained from the area specifications 212 and decoupling capacitor utilization may be obtained from the decoupling capacitor utilization specifications 214. The number of units 216 may be calculated where N1=Area*Utilization/Area_unit. In other words, the number of units 216 is determined by the product of area and decoupling capacitor utilization divided by area per unit. Then the decoupling capacitor model 202 may be determined as (R_unit/N1, L_unit/N1, C_unit*N1). In other words, the total resistance is that of N1 units connected in parallel (R_unit/N1); the total inductance is that of N1 units connected in parallel (L_unit/N1); and the total capacitance is that of N1 units connected in parallel (C_unit*N1). Table 1 indicates the source for the area specifications 212 and the decoupling capacitor utilization specifications 214 in the different design stages of method 100. In terms of the area specifications 212, at first design stage 102 and second design stage 104, the area specifications 212 (where area is based on gate count) are used, while at third stage 106, real areas are used. In terms of the decoupling capacitor utilization specifications 214, at first design stage 102, a minimum utilization corresponding to a minimum capacitance is employed; at second design stage 104, a typical utilization corresponding to a typical capacitance is employed; and at third design stage 106, a real utilization corresponding to a real case is employed. In other words, at later stage(s) (e.g., the third design stage 106), the source for the area specifications 212 and the decoupling capacitor utilization specifications 214 becomes closer to real cases of the SOC.

TABLE 1

| Design Stage | Area Specification | Decoupling Capacitor Utilization Specification | Notes |
| --- | --- | --- | --- |
| 1st Design Stage 102 | Specification (based on gate count) | Minimum Utilization | Minimum Capacitance |
| 2nd Design Stage 104 | Specification (based on gate count) | Typical Utilization | Typical Capacitance |
| 3rd Design Stage 106 | Real Area | Real Utilization | Real Case |

Figure 4:
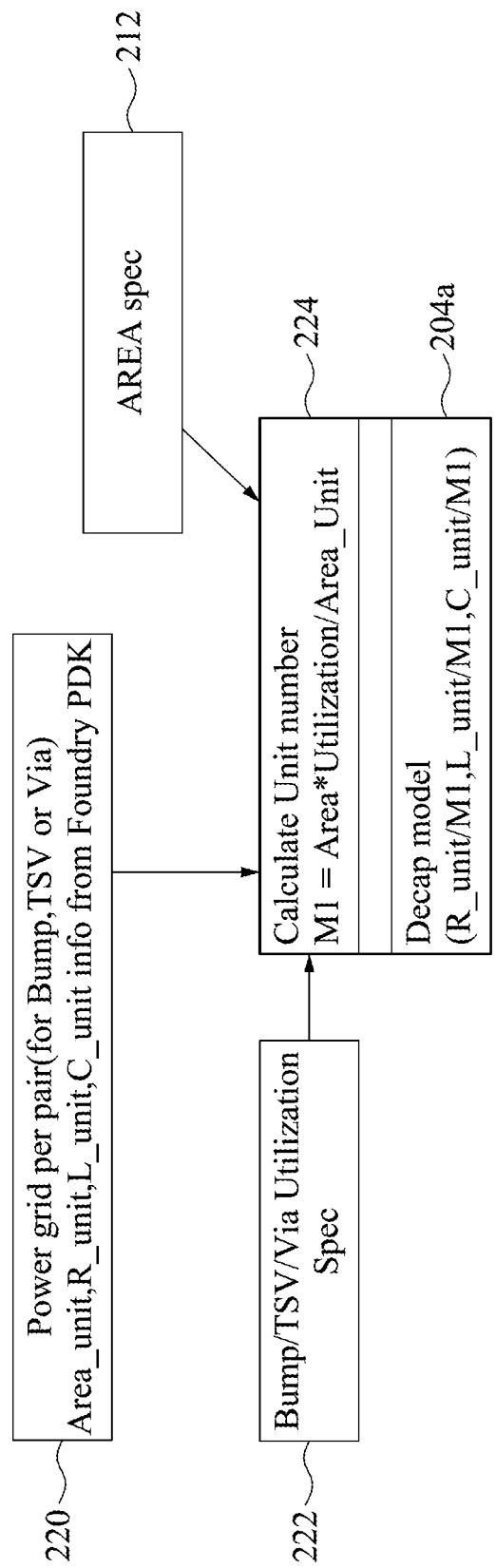
FIG. 4 illustrates power grid model extraction in accordance with some embodiments.

FIG. 4 illustrates power grid model 204 extraction from FIG. 2 in more detail. The power grid model 204 includes a power grid model 204a for different packaging techniques such as wafer bumping, through-silicon via (TSV) and vertical interconnect access (Via) and a power grid model 204b for power mesh. As shown in FIG. 4, the power grid model 204a for different packaging techniques such as wafer bumping, TSV and Via may be determined by calculating the number of units 224 based on power grid unit data (e.g., power grid per pair for wafer bumping, TSV and Via) 220, the area specifications 212 and bump/TSV/Via utilization specifications 222. Power distribution networks in SOCs are commonly structured as a multilayer grid called SOC power grid. In the SOC power grid, straight power/ground (P/G) lines in each metallization layer may span the entire die (or a large functional unit) and may be orthogonal to the lines in the adjacent layers. Different packaging techniques such as wafer bumping, TSV and Via are used to connect a power (ground) line to another power (ground) line at the overlap sites. Wafer bumping is a packaging process whereby metal solder balls or bumps are formed on the semiconductor wafer prior to dicing. Wafer bumps provide an interconnection between the die and a substrate or printed circuit board in a device. A through-silicon via (TSV) or through-chip via is a vertical electrical connection that passes completely through a silicon wafer or die. TSVs are high performance interconnect techniques used as an alternative to wire-bond and flip chips to create 3D packages and 3D integrated circuits. Compared to alternatives such as package-on-package, the interconnect and device density is substantially higher, and the length of the connections becomes shorter. A Via is an electrical connection between layers in a physical electronic circuit that goes through the plane of one or more adjacent layers.

Power grid unit data (e.g., power grid per pair for wafer bumping, TSV and Via) 220 may be obtained from data in a foundry PDK. The power grid unit data 220 may comprise, but are not limited to, area per unit (Area_unit), resistance per unit (R_unit), inductance per unit (L_unit), and capacitance per unit (C_unit). Area may be obtained from the area specifications 212 and bump/TSV/Via utilization may be obtained from the bump/TSV/Via utilization specifications 222. The number of units 224 may be calculated where M1=Area*Utilization/Area_unit. In other words, the number of units 224 is determined by the product of area and bump/TSV/Via utilization divided by area per unit. Then the power grid model 204a may be determined as (R_unit/M1, L_unit/M1, C_unit*M1). In other words, the total resistance is that of M1 units connected in parallel (R_unit/M1); the total inductance is that of M1 units connected in parallel (L_unit/M1); and the total capacitance is that of M1 units connected in parallel (C_unit*M1). Table 2 indicates the source for the area specifications 212 and the bump/TSV/Via utilization specifications 222 in different stages of method 100. In terms of the area specifications 212, at first design stage 102 and second design stage 104, the area specifications 212 (where area is based on gate count) are used, while at third stage 106, real areas are used. In terms of the bump/TSV/Via utilization specifications 222, at first design stage 102, a maximum number corresponding to a minimum inductance is employed; at second design stage 104, a typical number corresponding to a typical inductance is employed; and at third design stage 106, real numbers corresponding to real cases are employed. In other words, at later stage(s) (e.g., the third design stage 106), the source for the area specifications 212 and the bump/TSV/Via utilization specifications 222 becomes closer to real cases of the SOC.

TABLE 2

| Design Stage | Area Specification | Bump/TSV/Via Utilization Specification | Notes |
|---|---|---|---|
| 1st Design Stage 102 | Specification (based on gate count) | Maximum Number (M1) | Minimum L Inductance |
| 2nd Design Stage 104 | Specification (based on gate count) | Typical Number (M1) | Typical L Inductance |
| 3rd Design Stage 106 | Real Area | Real Number (M1) | Real Case |

Figure 5:
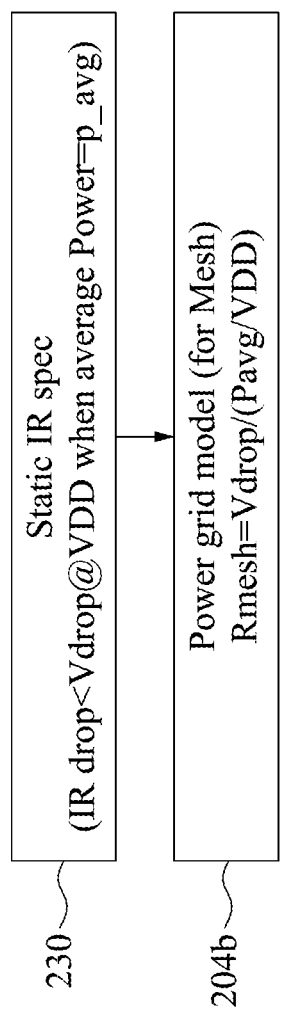
FIG. 5 illustrates power grid model extraction in accordance with some embodiments.

FIG. 5 illustrates power grid model 204 extraction from FIG. 2 in more detail. As shown in FIG. 5, the power grid model 204b for power mesh may be determined by calculating resistance of the SOC power grid for power mesh ($R_{mesh}$) based on static IR specifications 230. A power mesh is a multilayered mesh used for on-chip power supply to reduce IR drop of the SOC power grid. In one example, a power mesh includes a first mesh for distributing the electrical ground (GND) and a second mesh for distributing the first potential (VDD). The power grid model 204b for power mesh may be determined by the static IR specification 230. In one example, the static IR specifications 230 may provide that the IR drop of the SOC power grid (IR drop) is smaller than the potential drop at a first potential VDD (Vdrop@VDD), assuming that the average power is P_avg. The power grid model 204b for power mesh may be determined as $R_{mesh}=V_{drop}/(P\_avg/VDD)$. In other words, the resistance of the SOC power grid for power mesh ($R_{mesh}$) is the potential drop ($V_{drop}$) divided by the average current, whereas the average current is the average power (P_avg) divided by the first potential (VDD). Table 3 indicates the source for the static IR specifications 230 in different stage of method 100. At first design stage 102, best static IR specifications corresponding to a minimum resistance are employed; at second design stage 104, typical static IR specifications corresponding to a typical resistance are employed; and at third design stage 106, real power mesh resistances corresponding to real cases are employed. In other words, at later stage(s) (e.g., the third design stage 106), the source for the static IR specifications 230 becomes closer to real cases of the SOC.

TABLE 3

| Design Stage | Static IR Specification | Notes |
|---|---|---|
| 1st Design Stage 102 | Best Static IR Specification | Minimum R Resistance |
| 2nd Design Stage 104 | Typical Static IR Specification | Typical R Resistance |
| 3rd Design Stage 106 | Real Power Mesh R Resistance | Real Case |

Figure 6:
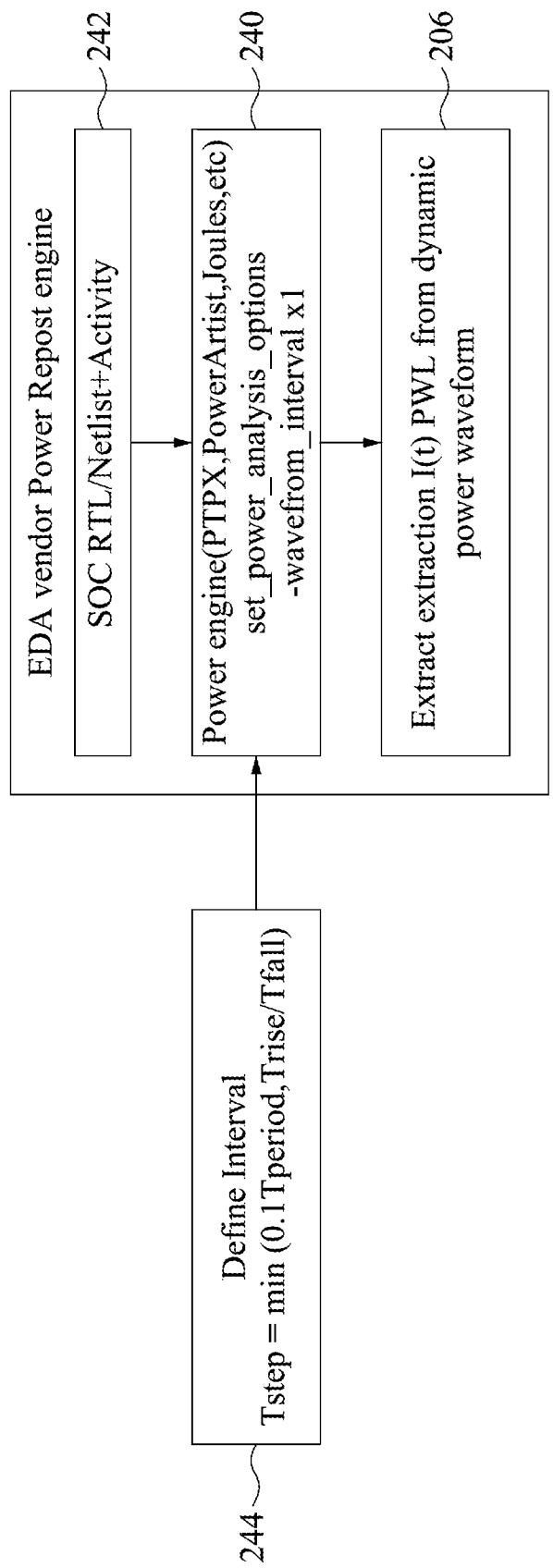
FIG. 6 illustrates dynamic power extraction in accordance with some embodiments.

FIG. 6 illustrates dynamic power extraction 206 from FIG. 2 in more detail. As shown in FIG. 4, Various power report engines 240 to analyze power dissipation of designs may be generated by Electronic Design Automation (EDA) vendors. Some examples of power report engines 240 include PrimeTime PX, PowerArtist and Joules RTL Power Solution. The input data may comprise the SOC RTL/Netlist and activity 242 for the SOC at each of the corresponding design stages. In addition, the input data may include a defined interval $T_{step}$ 244. If the defined interval $T_{step}$ 244 is too small, the extraction process will be too slow and a lot of unreasonable glitches occur. On the other hand, if the defined interval $T_{step}$ 244 is too large, the real load transient cannot be observed. Therefore, there is a trade-off between simulation time and accuracy. In one example, the defined interval $T_{step}$ 244 may be chosen as the following: $T_{step}$=min (0.1×$T_{period}$, $T_{rise}/T_{fall}$). In other words, the defined interval $T_{step}$ 244 is the smaller value of: (1) 10% of the period $T_{period}$; and (2) the ratio of rise time to fall time ($T_{rise}/T_{fall}$). This may provide a proper step for the SOC current profile generation based on harmonics amplitude analysis. Specifically, this may be based on $A_n$=2/(n×n) where, n is the n-th square wave (e.g., after the 5th harmonic, the amplitude is smaller than 12%; and after $9^{th}$ harmonic, the amplitude is smaller than 7%). It should be noted that the defined interval $T_{step}$ 244 could be chosen as other values. In one example, the power report engine 240 extracts 206 the SOC current profile I(t) in piecewise linear (PWL) format from dynamic power waveform. PWL format is associated with PWL modeling, which is a method of breaking down complex signal behavior into several linear segments (or discrete data sets). It should be noted that other formats could be employed.

Figure 7:
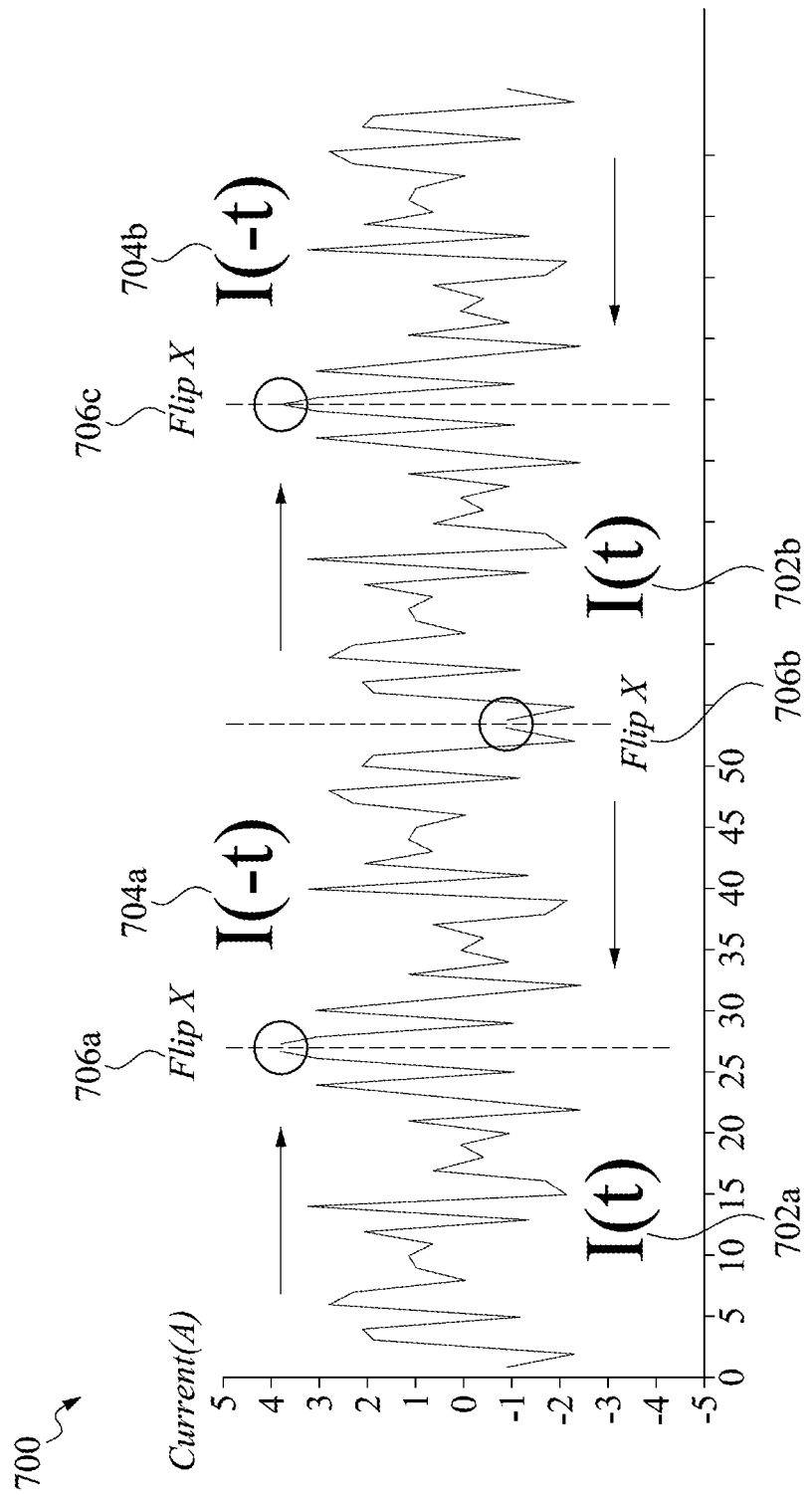
FIG. 7 illustrates flipping back the SOC current profile I(t) in accordance with some embodiments.

FIG. 7 illustrates an example of a processed SOC current profile 700. The example processed SOC current profile is processed by flipping back the SOC current profile I(t) 702a during at least one of the first co-simulation, the second co-simulation, and the third co-simulation, in order to extend the relatively short duration of SOC current profile 700a for relatively long durations of IVR simulations. IVR simulations have relative long durations because IVR need relatively long time to settle. A loop pattern may be used in IVR simulations in order to see repeatability. It may be hard to make the loop start current and the loop end current be the same. Therefore, as shown in FIG. 7, the current profile I(t) 702a is flipped back 706a at the end of its relatively short duration from I(t) 702*a* to I(−t) 704*a*. Subsequently, the flipped current profile I(−t) 704*a* is flipped back 706*b* at the end of its relatively short duration from I(−t) 704*a* to I(t) 702*b*. Subsequently, the flipped current profile I(t) 702*b* is flipped back 706*c* at the end of its relatively short duration from I(t) 702*b* to I(−t) 704*b*. In other words, the current profile I(t) 702*a* is flipped back three times (i.e., 706*a*, 706*b* and 706*c*) in this example to fit the relatively long duration of IVR simulations. Because of the flipping back (i.e., 706*a*, 706*b* and 706*c*), discontinuity which occurs when the current profile I(t) is simply repeated can be avoided. In one example, when looping back the same current profile, at the end of the waveform, flipping back the current profile may be performed so that false current changes may be avoided because of the flipped loop. This may also cover a more realistic load case.

Figure 8:
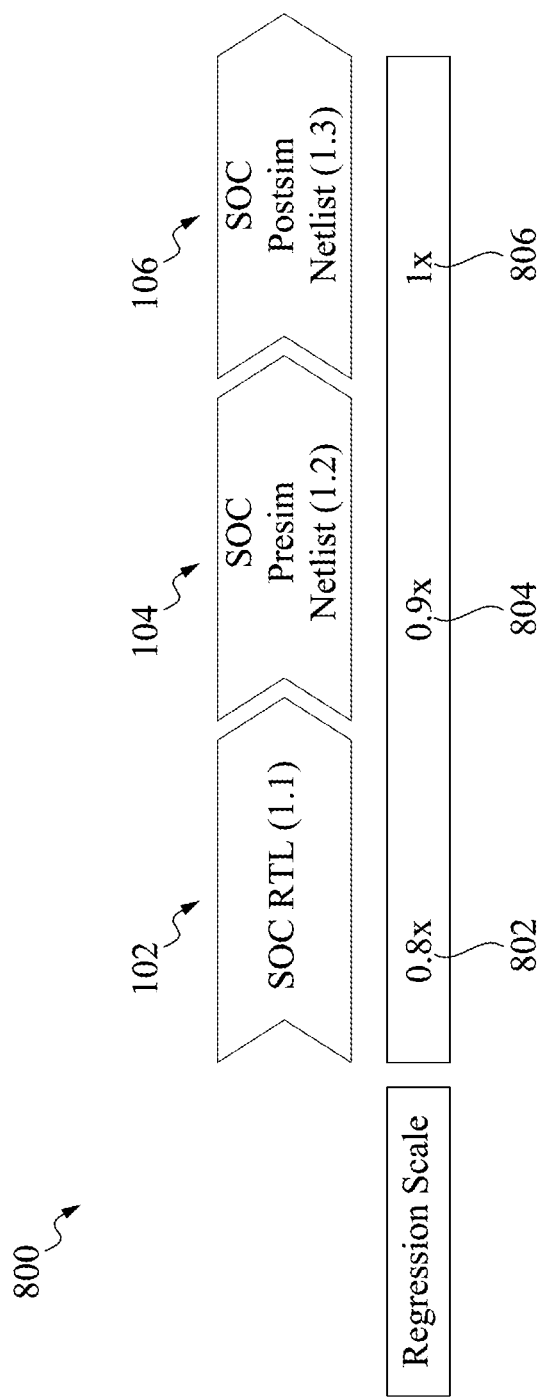
FIG. 8 illustrates a regression scaling for decoupling a capacitor model and a power grid model through the design stages in accordance with some embodiments.

FIG. 8 illustrates a regression scaling 800 for decoupling capacitor model 202 and power grid model 204 through the design stages of method 100. As the regression scales at different design stages of method 100 increase, the co-simulation result converges. As shown in FIG. 8, each design stage may relax the utilization specifications in the controlled rate to make the co-simulation result converge and provide better margin control. In the example shown in FIG. 8, at first design stage (e.g., the RTL design stage) 102, the regression scale 802 is set to be 0.8×; at second design stage (e.g., the presim design stage) 104, the regression scale 804 is increased to 0.9×; and at third design stage (e.g., the postsim design stage) 106, the regression scale 806 is further increased to 1×. The regressing scaling 800 (including the regression scale 802, the regression scale 804 and the regression scale 806) can be a guideline for foundries or IP vendors. Table 4 indicates in detail a regression scaling 800 for decoupling capacitor model 202 and power grid model 204 through the design stages of method 100. Specifically, regression scaling 800 for the area specifications 212, the decoupling capacitor utilization specifications 214, the bump/TSV/Via utilization specifications 222 and the static IR specifications 230 through the design stages of method 100 are indicated in Table 4. The scaling factors shown in FIG. 8 and Table 4 are examples and other scaling factors may be used.

TABLE 4

| Design Stage | Area Specification | Bump/TSV/Via Utilization Specification | Decoupling Capacitor Utilization Specification | Static IR Specification |
| --- | --- | --- | --- | --- |
| 1st Design Stage 102 | 0.8x | x/0.8 | 0.8x | x/0.8 |
| 2nd Design Stage 104 | 0.9x | x/0.9 | 0.9x | x/0.9 |
| 3rd Design Stage 106 | 1x | 1x | 1x | 1x |

Figure 9:
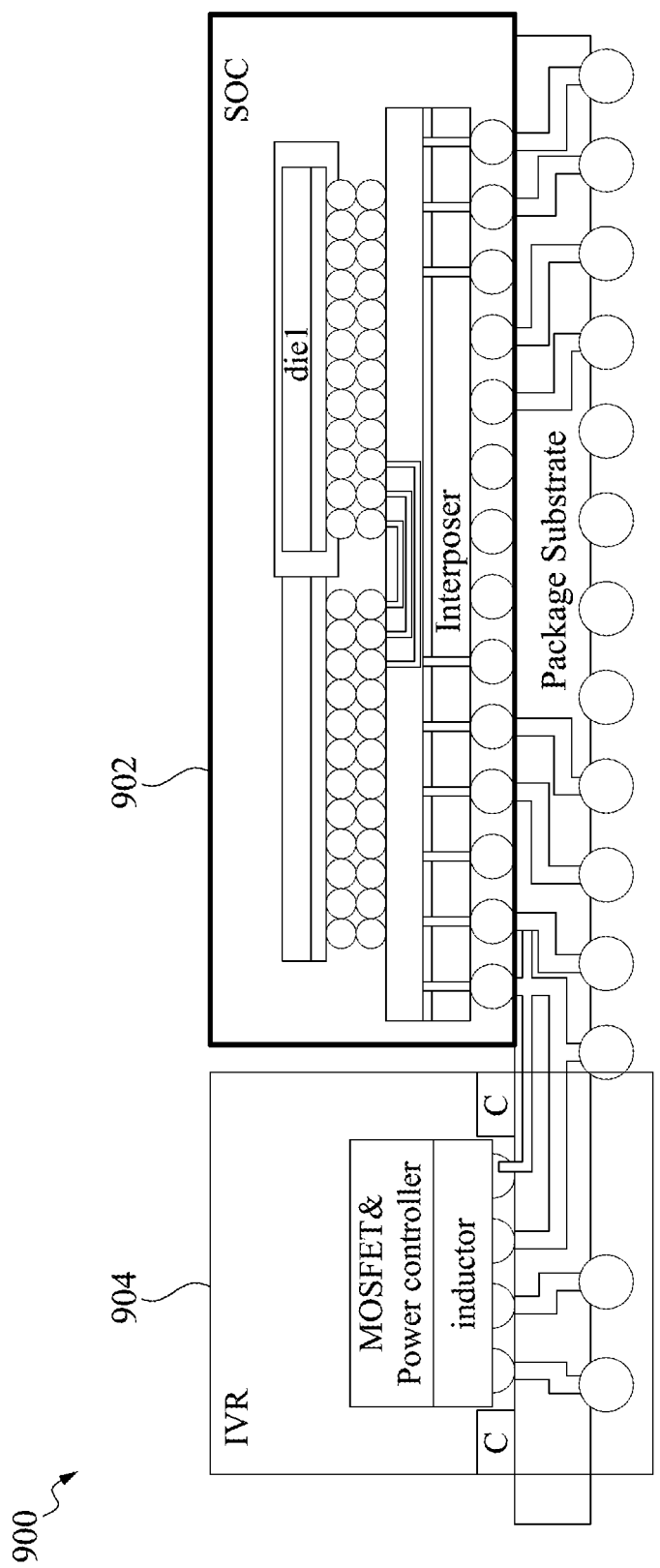
FIG. 9 shows a device comprising a System on Chip (SOC) and an Integrated Voltage Regulator (IVR) in accordance with some embodiments.

FIG. 9 shows an example device 900 in accordance with aspects of the disclosure. Device 900 may comprise an SOC 902 and an IVR 904. Consistent with embodiments of the disclosure, IVR 904 may be integrated with SOC 902. IVR 904 may comprise, but is not limited to, a switching regulator or a low-dropout (LDO) regulator. Furthermore, SOC 902 and IVR 904 may be co-designed using co-simulations during early stages of the co-design process. SOC 902 and IVR 904 may be co-designed, for example, to control costs, to avoid overdesign, and to allow the designer to perform progressive margin control. The co-design process for SOC 902 and IVR 904 may comprise, but is not limited to, method 100 as described in greater detail above with respect to FIG. 1.

Embodiments of the disclosure may provide a consistent SOC Current Profile Model extraction through an SOC RTL design stage, a pre-simulation design stage, and a post simulation design stage that may have power mesh, bump, decoupling capacitor, and current waveform information for IVR/SOC co-design at early design stages. Moreover, embodiments of the disclosure may provide a process to extract power mesh, bump, decoupling capacitor, and current profile models at any SOC power simulation design stage. Furthermore, embodiments of the disclosure may provide a process of flipping back current profile to avoid false current changes caused by loops to make simulations more realistic. Also, embodiments of the disclosure may include a regression process for co-design convergence and margin control. Accordingly, embodiments of the disclosure may provide a fast TAT time for IVR and SOC co-design. In addition, embodiments of the disclosure may provide consistent IVR and SOC co-simulation for IVR design to avoid overdesign and to allow the designer to perform progressive margin control.

An embodiment of the disclosure may comprise a method. The method may comprise extracting a first current profile model corresponding to a System on Chip (SOC) at a first design stage of the SOC and determining that an Integrated Voltage Regulator (IVR) and the SOC pass a first co-simulation based on the extracted first current profile model. Next, the method may comprise extracting a second current profile model corresponding to the SOC at a second design stage of the SOC, the second design stage being subsequent to the first design stage and determining that the IVR and the SOC pass a second co-simulation based on the extracted second current profile model. Then the method may comprise extracting a third current profile model corresponding to the SOC at a third design stage of the SOC, the third design stage being subsequent to the second design stage and determining that the IVR and the SOC pass a third co-simulation based on the extracted third current profile model.

Another embodiment of the disclosure may comprise a device. The device may comprise a System on Chip (SOC) and an Integrated Voltage Regulator (IVR) integrated with the SOC. The SOC and the IVR are co-designed using co-simulations during stages of the co-design.

Yet another embodiment of the disclosure may comprise a method. The method may comprise extracting a first current profile model corresponding to a System on Chip (SOC) at a Register-Transfer Level (RTL) design stage of the SOC and determining that an Integrated Voltage Regulator (IVR) and the SOC pass a first co-simulation based on the extracted first current profile model. Next, the method may comprise extracting a second current profile model corresponding to the SOC at a pre-simulation design stage of the SOC and determining that the IVR and the SOC pass a second co-simulation based on the extracted second current profile model.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
extracting a first current profile model corresponding to a System on Chip (SOC) at a first design stage of the SOC;
determining that an Integrated Voltage Regulator (IVR) and the SOC pass a first co-simulation based on the extracted first current profile model;
extracting a second current profile model corresponding to the SOC at a second design stage of the SOC, the second design stage being subsequent to the first design stage;
determining that the IVR and the SOC pass a second co-simulation based on the extracted second current profile model;
extracting a third current profile model corresponding to the SOC at a third design stage of the SOC, the third design stage being subsequent to the second design stage; and
determining that the IVR and the SOC pass a third co-simulation based on the extracted third current profile model.

2. The method of claim 1, wherein the first design stage comprises a Register-Transfer Level (RTL) design stage.

3. The method of claim 1, wherein the second design stage comprises a pre-simulation design stage of the SOC.

4. The method of claim 1, wherein the third design stage comprises a post-simulation design stage of the SOC.

5. The method of claim 1, wherein at least one of the first current profile model, the second current profile model, and the third current profile model includes a decoupling capacitor model.

6. The method of claim 1, wherein at least one of the first current profile model, the second current profile model, and the third current profile model includes a power grid model.

7. The method of claim 6, wherein the power grid model corresponds to at least one of the following: bumps and Through-Silicon Vias (TSV).

8. The method of claim 6, wherein the power grid model corresponds to a power mesh of the SOC.

9. The method of claim 1, wherein at least one of the first current profile model, the second current profile model, and the third current profile model comprises a Piecewise Linear (PWL) description of an SOC I(t) extracted from a dynamic power waveform.

10. The method of claim 9, further comprising selecting a $T_{step}$ for the SOC I(t) comprising min $(0.1 \times T_{period}, T_{rise}/T_{fall})$.

11. The method of claim 10, further comprising flipping back the I(t) during at least one of the first co-simulation, the second co-simulation, and the third co-simulation.

12. The method of claim 1, further comprising applying a regression scaling to the first current profile, the second current profile, and the third current profile.

13. The method of claim 1, wherein the IVR comprises a switching regulator.

14. The method of claim 1, wherein the IVR comprises a low-dropout (LDO) regulator.

15. A method comprising:
extracting a first current profile model corresponding to a System on Chip (SOC) at a Register-Transfer Level (RTL) design stage of the SOC;
determining that an Integrated Voltage Regulator (IVR) and the SOC pass a first co-simulation based on the extracted first current profile model;
extracting a second current profile model corresponding to the SOC at a pre-simulation design stage of the SOC; and
determining that the IVR and the SOC pass a second co-simulation based on the extracted second current profile model.

16. The method of claim 15, further comprising:
extracting a third current profile model corresponding to the SOC at a post-simulation design stage of the SOC; and
determining that the IVR and the SOC pass a third co-simulation based on the extracted third current profile model.

17. The method of claim 16, wherein at least one of the first current profile model, the second current profile model, and the third current profile model includes at least one of the following a decoupling capacitor model, a power grid model, and a Piecewise Linear (PWL) description of an SOC I(t) extracted from a dynamic power waveform.

18. A method comprising:
extracting a first current profile model corresponding to a System on Chip (SOC) at a first design stage of the SOC;
determining that an Integrated Voltage Regulator (IVR) and the SOC pass a first co-simulation based on the extracted first current profile model;
extracting a second current profile model corresponding to the SOC at a second design stage of the SOC, the second design stage being subsequent to the first design stage;
determining that the IVR and the SOC pass a second co-simulation based on the extracted second current profile model; and
applying a first regression scaling to the first current profile and a second regression scaling to the second current profile, wherein the second regression scaling is larger than the first regression scaling.

19. The method of claim 18, further comprising:
extracting a third current profile model corresponding to the SOC at a third design stage of the SOC, the third design stage being subsequent to the second design stage;
determining that the IVR and the SOC pass a third co-simulation based on the extracted third current profile model; and
applying a third regression scaling to the third current profile, wherein the third regression scaling is larger than the second regression scaling.

20. The method of claim 18, wherein the first design stage comprises a Register-Transfer Level (RTL) design stage, the second design stage comprises a pre-simulation design stage of the SOC, and the third design stage comprises a post-simulation design stage of the SOC.

* * * * *